US011487036B2

United States Patent
Gomes et al.

(10) Patent No.: US 11,487,036 B2
(45) Date of Patent: Nov. 1, 2022

(54) REFLECTION FULL WAVEFORM INVERSION METHODS WITH DENSITY AND VELOCITY MODELS UPDATED SEPARATELY

(71) Applicant: CGG SERVICES SAS, Massy (FR)

(72) Inventors: Adriano Gomes, Houston, TX (US); Nicolas Chazalnoel, Houston, TX (US)

(73) Assignee: CGG SERVICES SAS, Massy (FR)

( * ) Notice: Subject to any disclaimer, the term of this patent is extended or adjusted under 35 U.S.C. 154(b) by 1049 days.

(21) Appl. No.: 15/865,905

(22) Filed: Jan. 9, 2018

(65) Prior Publication Data
US 2018/0196154 A1 Jul. 12, 2018

Related U.S. Application Data

(60) Provisional application No. 62/445,344, filed on Jan. 12, 2017.

(51) Int. Cl.
*G01V 1/36* (2006.01)
*G01V 1/28* (2006.01)
(Continued)

(52) U.S. Cl.
CPC .............. *G01V 1/362* (2013.01); *G01V 1/282* (2013.01); *G01V 1/303* (2013.01); *G01V 1/3808* (2013.01);
(Continued)

(58) Field of Classification Search
CPC ........ G01V 1/362; G01V 1/282; G01V 1/303; G01V 2210/6161
(Continued)

(56) References Cited

U.S. PATENT DOCUMENTS 4,953,142 A * 8/1990 Rimmer ................. G01V 1/282
367/53
4,992,992 A 2/1991 Dragoset, Jr.
(Continued)

OTHER PUBLICATIONS

Ramos-Martinez et al. (A robust FWI gradient for high-resolution velocity model building, 2016, SEG international Exposition and 86th Annual Meeting, pp. 1258-1262) (Year: 2016).*
(Continued)

*Primary Examiner* — Iftekhar A Khan
(74) *Attorney, Agent, or Firm* — Patent Portfolio Builders PLLC

(57) ABSTRACT

A reflection full waveform inversion method updates separately a density model and a velocity model of a surveyed subsurface formation. The method includes generating a model-based dataset corresponding to the seismic dataset using a velocity model and a density model to calculate an objective function measuring the difference between the seismic dataset and the model-based dataset. A high-wavenumber component of the objective function's gradient is used to update the density model of the surveyed subsurface formation. The model-based dataset is then regenerated using the velocity model and the updated density model, to calculate an updated objective function. The velocity model of the surveyed subsurface formation is then updated using a low-wavenumber component of the updated objective function's gradient. A structural image of the subsurface formation is generated using the updated velocity model.

20 Claims, 11 Drawing Sheets

(51) Int. Cl.
*G01V 1/30* (2006.01)
*G01V 1/38* (2006.01)

(52) U.S. Cl.
CPC .. *G01V 2210/44* (2013.01); *G01V 2210/6161* (2013.01); *G01V 2210/6222* (2013.01); *G01V 2210/6224* (2013.01)

(58) Field of Classification Search
USPC .......................................................... 703/10
See application file for complete search history.

(56) References Cited

U.S. PATENT DOCUMENTS

| | | | | | |
|---|---|---|---|---|---|
| 8,437,998 | B2* | 5/2013 | Routh | | G01V 1/28 |
| | | | | | 703/10 |
| 8,593,904 | B2* | 11/2013 | Soubaras | | G01V 1/3826 |
| | | | | | 367/16 |
| 9,702,993 | B2* | 7/2017 | Wang | | G01V 1/28 |
| 9,910,174 | B2* | 3/2018 | Shin | | G01V 1/282 |
| 9,921,328 | B2* | 3/2018 | Teyssandier | | G01V 1/006 |
| 10,048,394 | B2* | 8/2018 | De Cacqueray | | G01V 1/005 |
| 10,310,123 | B2* | 6/2019 | Xu | | G01V 1/303 |
| 10,520,619 | B2* | 12/2019 | Yang | | G01V 1/362 |
| 2007/0203673 | A1* | 8/2007 | Sherrill | | G01V 1/30 |
| | | | | | 702/14 |
| 2007/0282535 | A1* | 12/2007 | Sirgue | | G01V 1/28 |
| | | | | | 702/14 |
| 2010/0118651 | A1* | 5/2010 | Liu | | G01V 1/34 |
| | | | | | 367/50 |
| 2010/0142316 | A1* | 6/2010 | Keers | | G01V 1/282 |
| | | | | | 367/73 |
| 2010/0302906 | A1* | 12/2010 | Liu | | G01V 1/28 |
| | | | | | 367/59 |
| 2010/0322032 | A1* | 12/2010 | Shin | | G01V 1/303 |
| | | | | | 367/43 |
| 2011/0000678 | A1* | 1/2011 | Krebs | | G01V 1/301 |
| | | | | | 166/369 |
| 2011/0085413 | A1* | 4/2011 | Keers | | G01V 1/282 |
| | | | | | 367/20 |
| 2011/0090760 | A1* | 4/2011 | Rickett | | G01V 1/282 |
| | | | | | 367/73 |
| 2011/0317519 | A1* | 12/2011 | Liu | | G01V 1/28 |
| | | | | | 367/50 |
| 2012/0259601 | A1* | 10/2012 | Fuck | | G01V 1/301 |
| | | | | | 703/2 |
| 2013/0138408 | A1* | 5/2013 | Lee | | G01V 1/282 |
| | | | | | 703/2 |
| 2013/0238249 | A1* | 9/2013 | Xu | | G01V 1/303 |
| | | | | | 702/18 |
| 2013/0311149 | A1* | 11/2013 | Tang | | G06F 30/00 |
| | | | | | 703/2 |
| 2013/0343154 | A1* | 12/2013 | Zhang | | G01V 1/375 |
| | | | | | 367/24 |
| 2014/0129479 | A1* | 5/2014 | Warner | | G01V 1/306 |
| | | | | | 705/348 |
| 2015/0012256 | A1* | 1/2015 | Routh | | G01V 1/28 |
| | | | | | 703/10 |
| 2015/0120200 | A1* | 4/2015 | Brenders | | G01V 1/005 |
| | | | | | 702/18 |
| 2015/0362622 | A1* | 12/2015 | Denli | | G01V 1/282 |
| | | | | | 703/2 |
| 2016/0047924 | A1* | 2/2016 | Krohn | | G01V 1/303 |
| | | | | | 703/2 |
| 2016/0097870 | A1* | 4/2016 | Routh | | G01V 1/282 |
| | | | | | 703/2 |
| 2016/0146961 | A1* | 5/2016 | Ratcliffe | | G01V 1/286 |
| | | | | | 703/2 |
| 2016/0187506 | A1* | 6/2016 | Ratcliffe | | G01V 1/282 |
| | | | | | 702/14 |
| 2016/0216389 | A1* | 7/2016 | Hu | | G01V 1/325 |
| 2016/0238729 | A1* | 8/2016 | Warner | | G01V 1/364 |
| 2016/0245941 | A1* | 8/2016 | Rønholt | | G01V 1/282 |
| 2016/0282490 | A1* | 9/2016 | Qin | | G01V 1/303 |
| 2016/0320505 | A1* | 11/2016 | D'Afonseca | | G01V 1/345 |
| 2016/0334527 | A1* | 11/2016 | Xu | | G01V 99/005 |
| 2017/0131418 | A1* | 5/2017 | Wang | | G01V 1/303 |
| 2017/0168177 | A1* | 6/2017 | Wang | | G01V 1/282 |
| 2017/0168178 | A1* | 6/2017 | Crawley | | G01V 1/38 |
| 2017/0176613 | A1* | 6/2017 | Burnett | | G01V 1/003 |
| 2017/0205520 | A1* | 7/2017 | Moldoveanu | | G01V 1/3808 |
| 2018/0045839 | A1* | 2/2018 | Tang | | G06F 30/00 |
| 2018/0120464 | A1* | 5/2018 | Sun | | G01V 1/282 |
| 2018/0164453 | A1* | 6/2018 | Esser | | G01V 11/00 |
| 2018/0172858 | A1* | 6/2018 | Wang | | G01V 1/282 |
| 2018/0196154 | A1* | 7/2018 | Gomes | | G01V 1/303 |
| 2019/0196038 | A1* | 6/2019 | Willen | | G01V 99/005 |
| 2019/0257968 | A1* | 8/2019 | Qiu | | G01V 1/22 |
| 2019/0302293 | A1* | 10/2019 | Zhang | | G01V 1/303 |

OTHER PUBLICATIONS

Zhou et al. (Full waveform inversion of diving & reflected waves for velocity model building with impedance inversion based on scale separation, Geophys. J Int. (2015) 202, 1535-1551) (Year: 2015).*
A. Guitton, "On the velocity-density ambiguity in acoustic full-waveform inversion", 76th EAGE Conference & Exhibition, Amsterdam, The Netherlands, Jun. 16-19, 2014.
A. Ratcliffe et al., "Full Waveform Inversion—A North Sea OBC Case Study—Reloaded", 76th EAGE Conference & Exhibition, Jun. 16-19, 2014, Amsterdam, The Netherlands.
Albert Tarantola, "Inversion of seismic reflection data in the acoustic approximation", Geophysics, Aug. 1984, pp. 1259-1266, vol. 49, No. 8.
Amsalu Y. Anagaw et al., "Full waveform inversion with simultaneous sources using the full Newton Method", SEG Technical Program Expanded Abstracts, SEG Las Vegas 2012 Annual Meeting, Nov. 4-9, 2012, pp. 1-5.
Carey Bunks et al., "Multiscale seismic waveform inversion", Geophysics, Sep.-Oct. 1995, pp. 1457-1473, vol. 60, No. 5.
Denes Vigh et al., "Earth-model building from shallow to deep with full-waveform inversion", The Leading Edge, Dec. 2016, pp. 1025-1030.
Faqi Liu et al., "An effective imaging condition for reverse-time migration using wavefield decomposition", Geophysics, Jan.-Feb. 2011, pp. S29-S39, vol. 76, No. 1.
G.H.F. Gardner et al., "Formation velocity and density—the diagnostic basics for stratigraphic traps", Geophysics, Dec. 1974, pp. 770-780, vol. 39, No. 6.
Gilles Lambaré, "Stereotomography", Geophysics, Sep.-Oct. 2008, pp. VE25-VE34, vol. 73, No. 5.
J. Virieux et al., "An overview of full-waveform inversion in exploration geophysics". Geophysics, Nov.-Dec. 2009, pp. WCC1-WCC-26, vol. 74, No. 6.
Jaime Ramos-Martinez et al., "A robust FWI gradient for high-resolution velocity model building", SEG Internationa Exposition and 86th Annual Meeting, Oct. 16-21, 2016, Dallas, Texas, pp. 1258-1262.
Jorge Nocedal et al., "Numerical optimization", Springer Series in Operations Research, 1999.
Kenneth Irabor et al., "Reflection FWI", SEG International Exposition and 86th Annual Meeting, Dallas, Texas, Oct. 16-21, 2016, pp. 1136-1140.
Michael Warner et al., "Adaptive waveform inversion: Theory", Geophysics, Nov.-Dec. 2016, pp. R429-R445, vol. 81, No. 6.
Michael Warner et al., "Anisotropic 3D full-waveform inversion", Geophysics, Mar.-Apr. 2013, pp. R59-R80, vol. 78, No. 2.
Nicolas Chazalnoel et al., "Revealing shallow and deep complex geological features with FWI: Lessons learned", 79th EAGE Conference & Exhibition, Paris, France, Jun. 12-15, 2017.
Nuno V. Da Silva et al., "A new parameter set for anisotropic multiparameter full-waveform inversion and application to a North Sea data set", Geophysics, Jul.-Aug. 2016, pp. U25-U38, vol. 81, No. 4.
Peter Mora, "Inversion = migration + tomography", Geophysics, Dec. 1989, pp. 1575-1586, vol. 54, No. 12.

(56) References Cited

OTHER PUBLICATIONS

R. Gerhard Pratt, "Seismic waveform inversion in the frequency domain, Part 1: Theory and verification in a physical scale model", Geophysics, May-Jun. 1999, pp. 888-901, vol. 64, No. 3.

Sheng Xu et al., "Inversion on Reflected Seismic Wave", SEG Las Vegas 2012 Annual Meeting, Nov. 4-9, 2012, Las Vegas, Nevada, pp. 1-7.

Wei Zhou et al., "Full waveform inversion of diving & reflected waves for velocity model building with impedance inversion based on scale separation". Geophysical Journal International, 2015, pp. 1535-1554, vol. 202.

Yaxun Tang et al., "Tomographically enhanced full wavefield inversion", SEG Houston 2013 Annual Meeting, Houston, Texas, Sep. 22-27, 2013, pp. 1037-1041.

\* cited by examiner

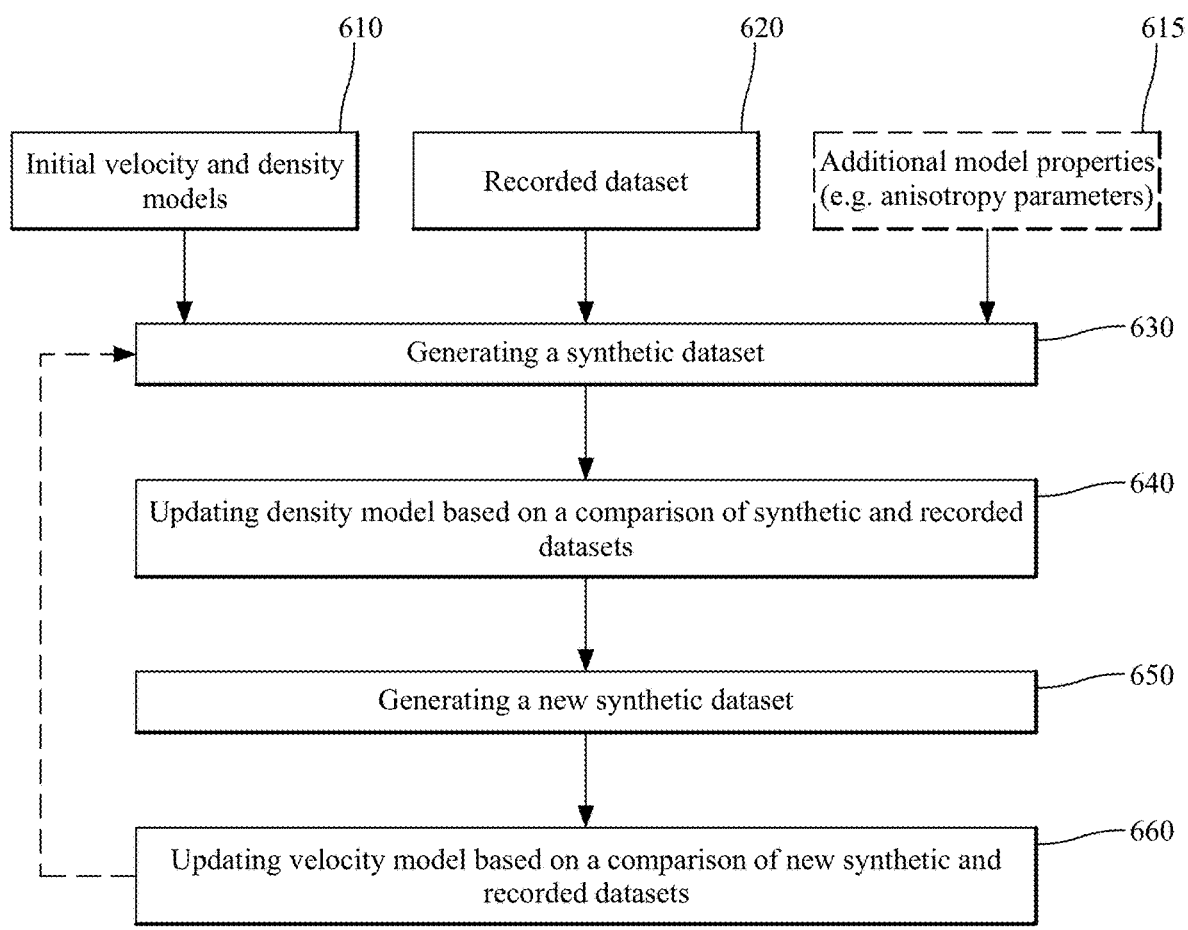

800

REFLECTION FULL WAVEFORM INVERSION METHODS WITH DENSITY AND VELOCITY MODELS UPDATED SEPARATELY

CROSS-REFERENCE TO RELATED APPLICATIONS

The present application is related to and claims the benefit of priority of U.S. Provisional Applications 62/445,344 filed Jan. 12, 2017, the entire content of which is incorporated herein by reference.

BACKGROUND

Technical Field

Embodiments of the subject matter disclosed herein generally relate to methods and systems performing reflection full waveform inversion (RFWI) and, more particularly, to mechanisms and techniques that estimate high-wavenumber and low-wavenumber of the full waveform inversion's gradient and use them separately to update the density and velocity models, respectively.

Discussion of the Background

Seismic surveys are used in geophysical exploration to probe underground formations based on seismic waves detected after traveling therethrough. During a seismic survey, a controlled seismic source generates seismic waves injected into the probed formation, and seismic sensors detect reflections of the seismic waves emerging from the formation, recording them as seismic data. Seismic data are series time and amplitude pairs recorded at a detection location. Between the source and the sensor, the seismic waves travel through various layers characterized by different propagation velocities, and part of the waves' energy is reflected and refracted at interfaces of the layers. A layer's impedance is a product of density and propagation velocity. The change in impedance at an interface determines the seismic waves to be partially reflected and partially refracted (i.e., reflectivity). The amplitude values correspond to seismic energy arriving at the sensors.

Seismic data is processed to generate a structural image of the probed geophysical formation. This image enables those trained in the field to assess the presence or absence of natural resources, such as oil and/or gas. Providing a high-resolution image of the subsurface is an ongoing process in the exploration of natural resources. Seismic data may be gathered on land or in marine environments.

A velocity model is a visual representation of the seismic wave's propagation velocity inside the underground formation. A seismic wave traveling from a source to a receiver may have different velocities depending on location, from about 1,500 m/s in seawater, to up to 6,000 m/s in different types of rock, depending on lithology.

Full waveform inversion (FWI) is a well-established method for building velocity models (as described in the article "Inversion of Seismic Reflection Data in the Acoustic Approximation," by A. Tarantola, *Geophysics*, Vol. 49, pp. 1259-1266, 1984, the entire content of which is included by reference). Conventional FWI methods rely on diving waves to update the velocity model. FIG. 1 illustrates direct waves 110, diving waves 160, incident waves 120, and reflected waves 130 traveling from a source 100 to a seismic sensor 140. The diving wave is refracted when a velocity increase "bends" the wave towards the surface. Reflected wave 130 may be reflected at interface 150 because the propagation velocity changes (i.e., the propagation velocity above interface 150 is different from the propagation velocity below interface 150). In addition, reflected wave 130 can be generated by density contrasts alone, even if there is no velocity variation.

Due to the limited offset characterizing the seismic data, the maximum depth at which the velocity model can be updated using diving waves is restricted. On the other hand, reflection data contains information about deeper areas of the model, but its use in conventional FWI is difficult due to poor initial model, lack of low frequencies and dependency on an accurate density model. As shown by P. Mora in the article "Inversion=migration+tomography," published in *Geophysics*, Vol. 54, pp. 1575-1586, 1989, reflection data can provide valuable low-wavenumber information to the FWI gradient, which is important to update the kinematics of the velocity model. In the shallow regions, this low-wavenumber information can also be obtained from the diving waves. However, in the deeper parts of the model, only reflection data is available.

Thus, there is a need to develop new FWI-type methods to fully use the low-wavenumber information provided by reflection data and enhance the results.

SUMMARY

In order to overcome the limitations of conventional FWI methods, the present inventive concept is based on using high-wavenumber and low-wavenumber components of the FWI gradient separately to update density and velocity models, respectively. These updates come from reflection data, which extends the applicability of conventional FWI workflow to areas deeper than probed by diving waves alone.

According to an embodiment, there is a method for exploring a subsurface formation using seismic waves. The method includes receiving a seismic dataset recorded by seismic sensors detecting seismic waves emerging from the explored subsurface formation. The method further includes generating a model-based dataset corresponding to the seismic dataset using a velocity model and a density model to calculate a gradient of an objective function measuring difference between the seismic dataset and the model-based dataset, and updating the density model using a high-wavenumber component of the gradient. The method then includes regenerating the model-based dataset for the subsurface formation using the velocity model and the updated density model, to calculate an updated gradient of an updated objective function, and updating the velocity model using a low-wavenumber component of the updated gradient. The method finally includes generating a structural image of the subsurface formation using the updated velocity model, for planning a drilling path therethrough.

According to another embodiment, there is a computing device for exploring a subsurface formation using seismic waves. The computing device has an interface and a processor connected to the interface. The interface is configured to receive a seismic dataset recorded by seismic sensors detecting seismic waves emerging from the explored subsurface formation. The processor is configured to generate a model-based dataset for the subsurface formation using a velocity model and a density model for calculating a gradient of an objective function measuring difference between the seismic dataset and the model-based dataset, to update the density model using a high-wavenumber component of the gradient, to regenerate the model-based dataset using the velocity model and the updated density model for calculating an updated gradient of an updated objective function, to update the velocity model using a low-wavenumber component of the updated gradient, and to generate a structural image of the subsurface formation using the updated velocity model, for planning a drilling path therethrough.

According to yet another embodiment, there is a non-transitory computer readable recording medium storing executable codes which when executed by a computer make the computer perform a method for exploring a subsurface formation using seismic waves. The method includes receiving a seismic dataset recorded by seismic sensors detecting seismic waves emerging from the explored subsurface formation. The method further includes generating a model-based dataset corresponding to the seismic dataset using a velocity model and a density model to calculate a gradient of an objective function measuring difference between the seismic dataset and the model-based dataset, and updating the density model using a high-wavenumber component of the gradient. The method then includes regenerating the model-based dataset for the subsurface formation using the velocity model and the updated density model, to calculate an updated gradient of an updated objective function, and updating the velocity model using a low-wavenumber component of the updated gradient. The method finally includes generating a structural image of the subsurface formation using the updated velocity model, for planning a drilling path therethrough.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a workflow of a RFWI method according to an embodiment;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
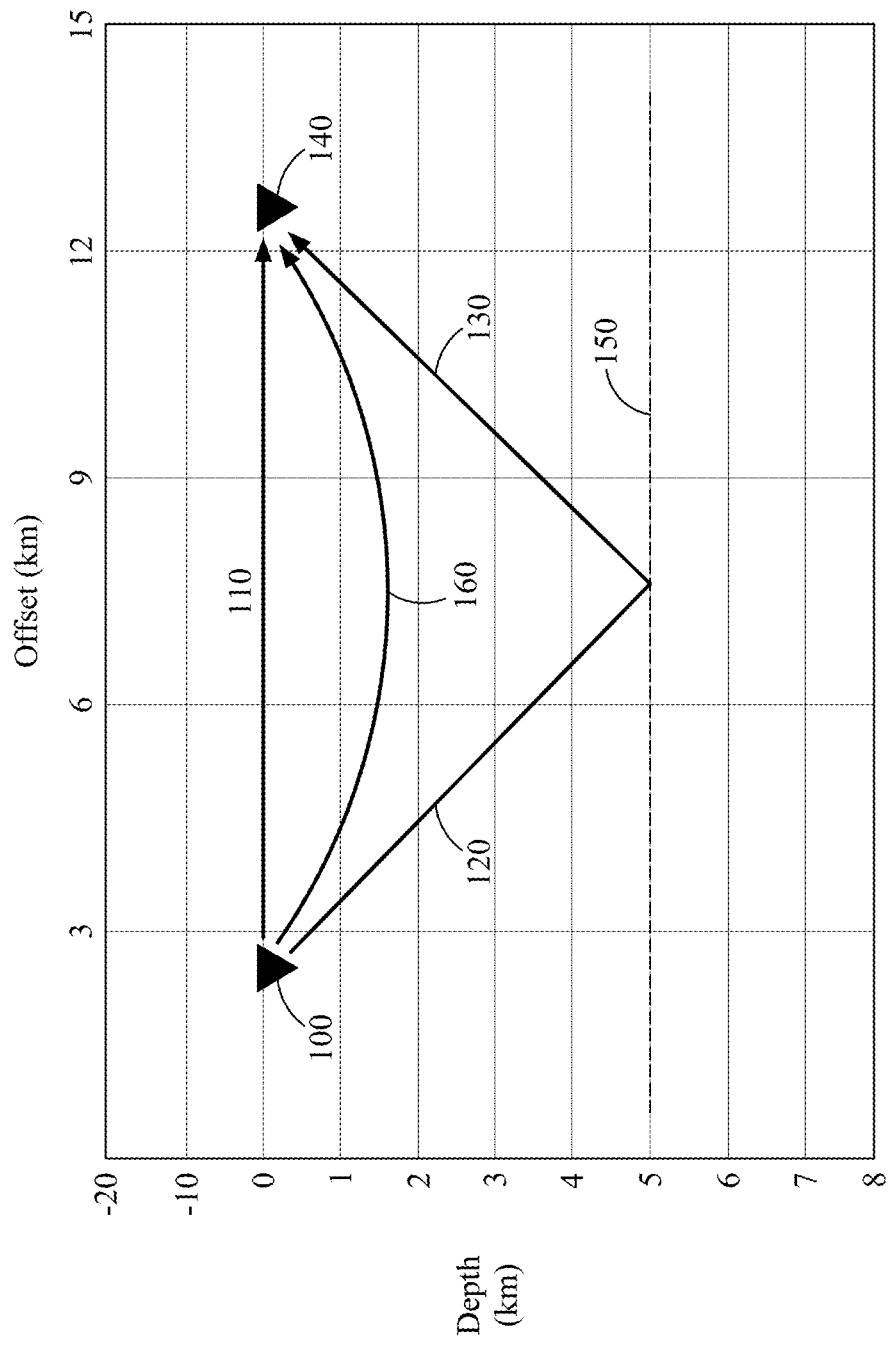
FIG. 1 illustrates direct waves, diving waves and reflected waves in seismic data acquisition.
Figure 2:
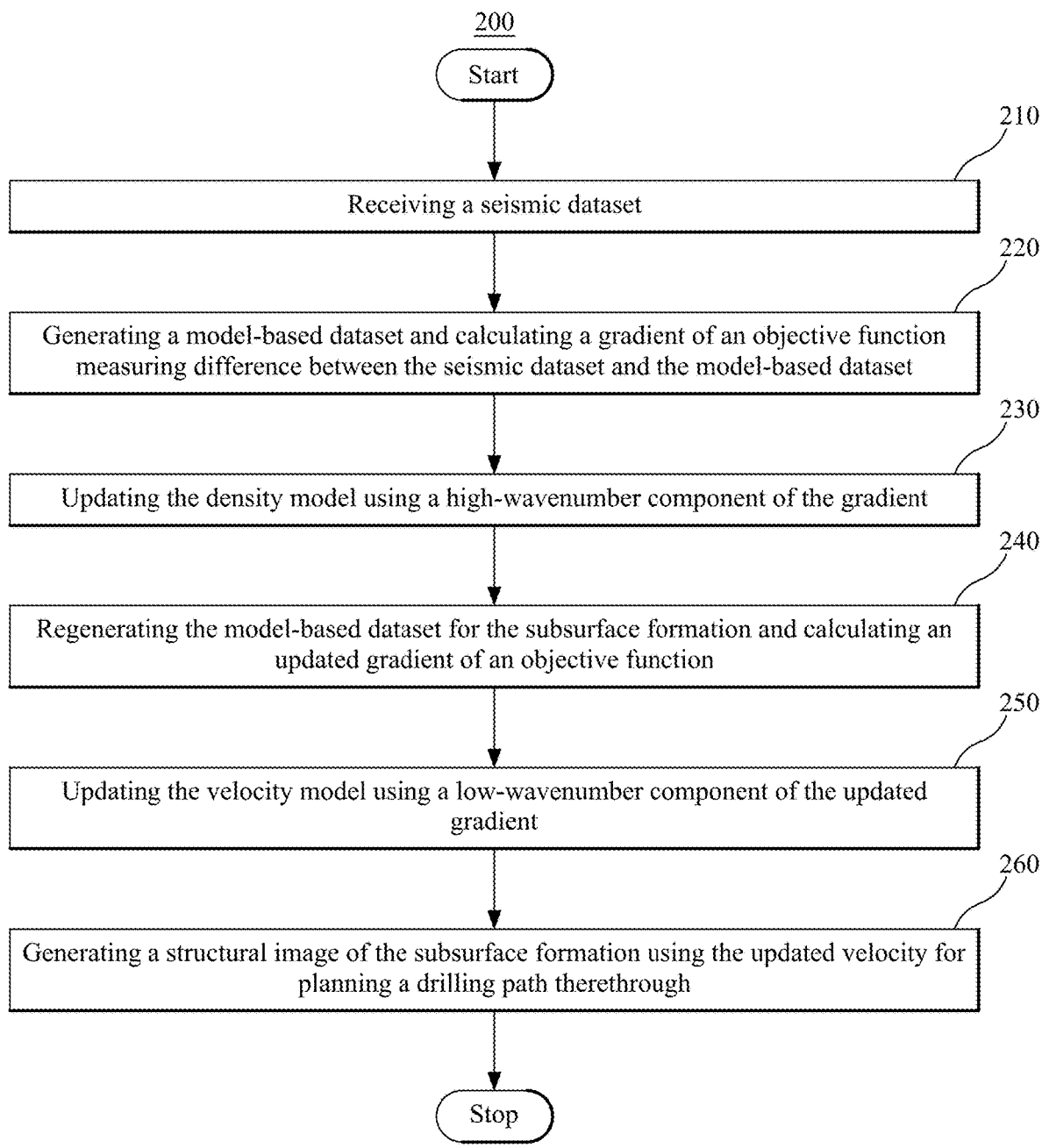
FIG. 2 is a flowchart of a method according to an embodiment.

The embodiments described in this section are related to exploring a subsurface formation using seismic waves and extracting structural information from seismic data recorded by seismic sensors detecting the seismic waves emerging from the explored subsurface formation. FIG. 2 is a flowchart of a method 200 according to an embodiment, and it is set forth at the beginning of this section to provide a roadmap for the ensuing descriptions of various embodiments and enablement aspects. Method 200 includes receiving a seismic dataset at 210, generating a model-based dataset corresponding to the seismic dataset, and calculating a gradient of an objective function measuring the difference between the seismic dataset and the model-based dataset at 220. Method 200 further includes updating the density model using a high-wavenumber component of the gradient at 230. After regenerating the model-based dataset for the subsurface formation and calculating an updated gradient of an updated objective function at 240, method 200 includes updating the velocity model using a low-wavenumber component of the updated gradient at 250. Finally, a structural image of the subsurface formation is generated using the updated velocity at 260, in order to plan a drilling path through the subsurface formation. The structural image may be used for other purposes, such as, for example, determining presence and location of mineral deposits.

Steps 220-250 may be performed repeatedly. Alternatively or additionally, steps 220-230 may be performed with iteratively enhanced density models before performing steps 240 and 250, which may also be performed with iteratively enhanced velocity models. In one embodiment, steps 220-250 are performed a until a predetermined condition is met. The condition may be a predetermined number of iterations or a convergence criterion.

Optionally, anisotropy, elastic effects and attenuation are taken into consideration in steps 220 and/or 240. The updating in step 230 and/or 250 may be subject to constraints so as the updated density model and/or velocity model to be closer to a physical reality of the explored subsurface than the density and/or velocity model prior to the respective updating. The constraints may be based on additional structural information such as well logs.

In one embodiment, the density model may also be updated in step 250. In another embodiment a reflectivity model may be updated instead of the density model in step 230.

Figure 3:
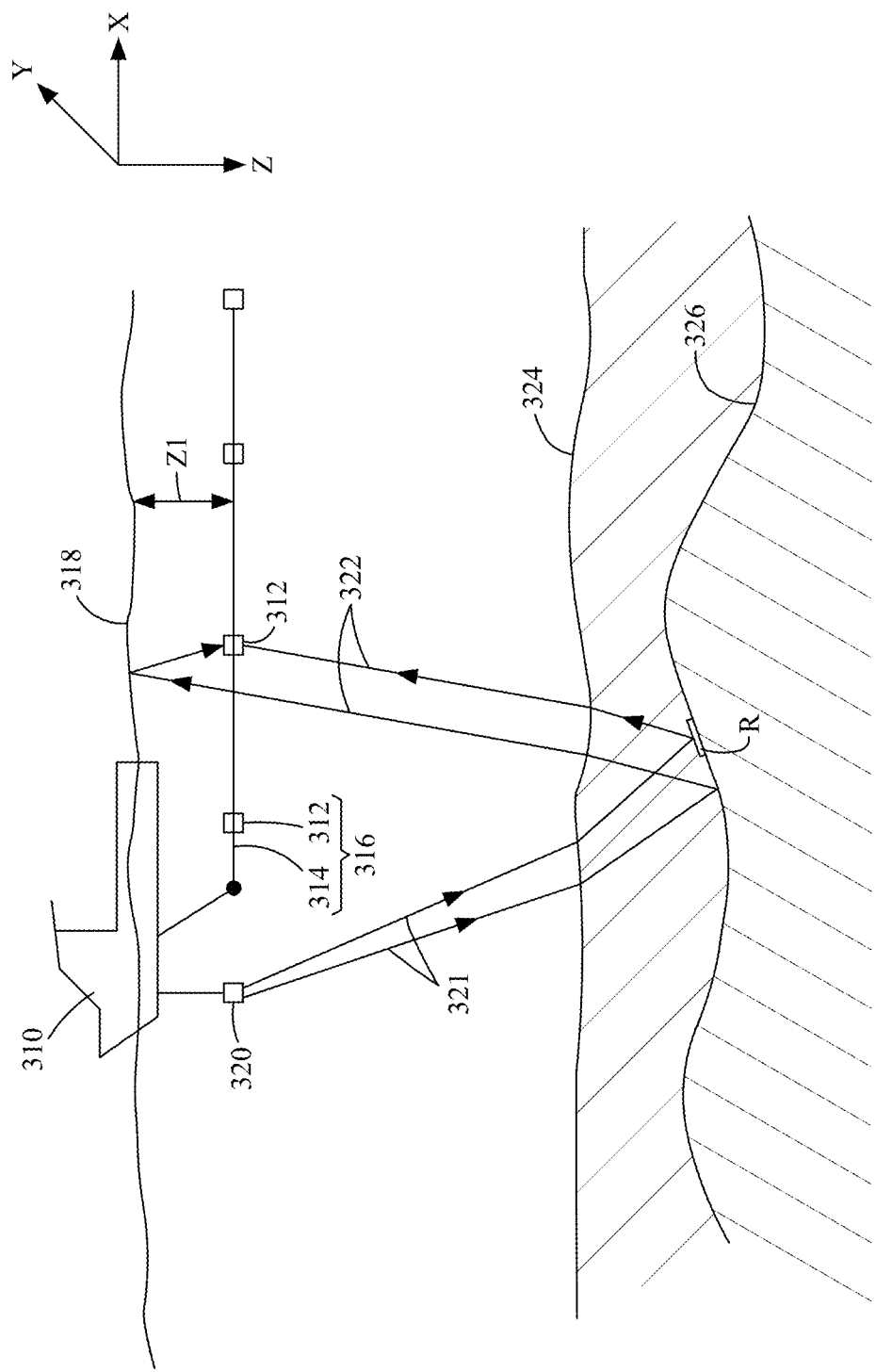
FIG. 3 illustrates marine seismic data acquisition.

The seismic data may be acquired in a marine environment or on land. FIG. 3 illustrates marine seismic data acquisition. A vessel 310 tows at least one cable 314 housing plural seismic sensors 312. Cable 314 and seismic sensors 312 are referred to as a streamer 316. Vessel 310 may tow plural parallel streamers (only one is visible in this vertical view). The streamers may lie in a plane at a constant depth $z_1$ relative to the ocean surface 318. Alternatively, the plural streamers may be slanted with respect to the ocean surface as disclosed in U.S. Pat. No. 4,992,992, the entire content of which is incorporated herein by reference. In one embodiment, the streamers may have a curved profile as described, for example, in U.S. Pat. No. 8,593,904, the entire content of which is incorporated herein by reference.

Vessel 310 may also tow a seismic source 320 configured to generate acoustic waves that penetrate the seafloor 324 and are reflected, for example, at the layer interface 326 (e.g., by a reflecting structure R). Reflected acoustic waves may be detected by a seismic sensor as up-going from the seafloor or after being reflected by the water surface. For simplicity, FIG. 3 illustrates two wave-propagating paths from the source to a sensor 312 (here, down-going segments are labeled 321 and up-going segments 322).

Figure 4:
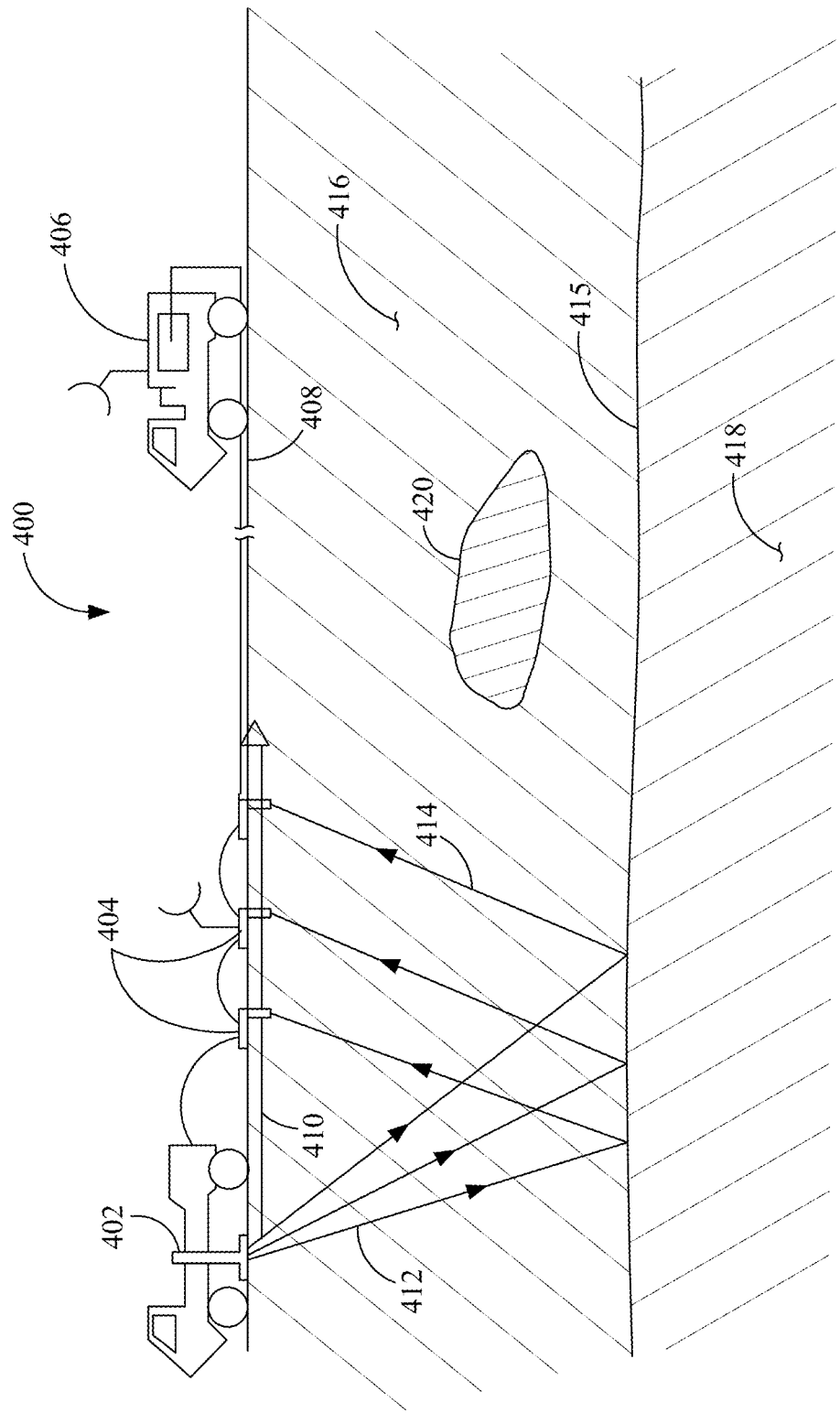
FIG. 4 illustrates land seismic data acquisition.

FIG. 4 illustrates seismic data being acquired on land. Land seismic data acquisition system 400 includes a source 402 carried by a truck and consisting of a vibrator configured to generate a seismic excitation, seismic sensors 404 that detect seismic waves and a recorder 406 (also mounted on a truck) for storing the seismic data generated by the sensors. Source 402, sensors 404 and recorder 406 are positioned on the surface of the ground 408 but, alternatively or additionally, sensors and source may be buried underground. The seismic excitation generated by source 402 propagates as surface waves 410 (known as ground roll or Rayleigh waves), and penetrates underground as transmitted waves 412 that are reflected (see waves 414) when encountering an interface 415 between two geological layers 416 and 418 (with different seismic wave propagation speeds). In a solid medium, the seismic excitation is a combination of P-waves (pressure waves) and S-waves (shear waves). P-waves produce, as they pass through the media, localized volumetric changes in the media, while S-waves produce a localized distortion in the media with corresponding particle motion.

Sensors 404 detect both the surface waves and the reflected waves, and are typically geophones (while hydrophones are more often used in a marine environment). However, multi-sensors, geophones, hydrophones, differential pressure sensors and accelerometers may be used as seismic sensors in a marine environment and on land. Note also that the sensors may be deployed temporarily or left for repeated measurements at different calendar times, may be housed in towed cables or placed at the ocean bottom, may be buried at different locations or placed along a wellbore, etc. The image of the underground geological formation enables assessing the presence and location of hydrocarbon reservoirs such as 420.

Relative to step 220, FWI estimates properties of the subsurface, such as P-wave velocity, by minimizing the difference between the recorded seismic data d and synthetic seismic data $\tilde{d}$. For example, the L-2 norm objective function J is minimized:

$$J=\|d-\tilde{d}\|^2 \quad (1)$$

$\|\cdot\|$ denoting the L-2 norm.

Synthetic data may be obtained by forward modeling using a current velocity and/or density model. For example, in an approach using velocity model only, synthetic data is obtained using the acoustic constant-density wave equation:

$$\frac{\partial^2 p}{\partial t^2} = v^2 \nabla^2 p + f, \quad (2)$$

where p is the wavefield that is to be extracted at the sensor locations to obtain $\tilde{d}$, v is the current velocity model, $\nabla^2$ is the Laplacian operator and f is a source term.

Equation (1) is minimized by iterative optimizations, such as using the steepest-descent method, in which the velocity model v is updated by:

$$v_{k+1}=v_k-\alpha_k g_k, \quad (3)$$

where k denotes the iteration index, $\alpha$ is a constant scalar called the step-length (which may be obtained by a line-search) and g represents the gradient of J, i.e., the derivative of J with respect to the model parameters being inverted.

The gradient g can be efficiently calculated using an adjoint-state method (as described in the previously-mentioned article by Tarantola):

$$g = \frac{2}{v^3} \int_0^{t_{max}} \lambda \frac{\partial^2 p}{\partial t^2} dt, \quad (4)$$

where $\lambda$ is the back-propagated data residual $(d-\tilde{d})$.

Conventional FWI performs: (A) generating synthetic data d using a current velocity model, (B) calculating residual between recorded seismic data and synthetic data $d-\tilde{d}$, (C) calculating the gradient of the objective function using equation (4), and (D) updating the velocity model as in equation (3). Steps (A)-(D) are repeated until a stop condition is met. The steps may be repeated for several frequencies or frequency bands until a satisfactory result is achieved (as described in the article, "Seismic waveform inversion in the frequency domain, Part 1: Theory and verification in a physical scale model," by R. G. Pratt, published in *Geophysics*, Vol. 64, No. 3, pp. 888-901, 1999, and in the article, "Multiscale seismic waveform inversion," by Bunks et al., published in *Geophysics*, Vol. 60, No. 5, pp. 1457-1473, 1995, which are incorporated herein by references).

Extensive FWI-related research has attempted to overcome FWI limitations or extend its capabilities. Improvements were sought by more accurate wave equation simulation (as described in "Full Waveform Inversion—A North Sea OBC Case Study—Reloaded," by Ratcliffe et al., presented at 76th EAGE Conference & Exhibition, and published in *Extended Abstracts,* 2014), estimation of different model parameters (as described in "A new parameter set for anisotropic multiparameter full-waveform inversion and application to a North Sea data set," by da Silva et al., published in *Geophysics*, Vol. 81, No. 4, pp. R157-R171, 2016), more robust optimization methods (as described in "Full waveform inversion with simultaneous sources using the full Newton Method" by Anagaw et al., in SEG Technical Program Expanded Abstracts Las Vegas 2012), and different objective functions (as described in "Adaptive waveform inversion: Theory," by Warner et al., published in *Geophysics*, Vol. 81, No. 6, pp. R429-R445, 2016). All the articles cited in this section are incorporated by reference in their entirety.

Another aspect subject to ongoing investigation is the role of reflection data in FWI. On one hand, the use of reflection data in FWI presents the following three main practical challenges.

1. A reflection is not generated by a contrast in one parameter alone. It can be formed by a contrast in the P-wave velocity, the density, or by variations in both parameters.

2. It requires a good background velocity model, containing some level of contrast or detail, to both generate and correctly place the reflections and avoid the so-called cycle-skipping (as pointed out in "An overview of full-waveform inversion in exploration geophysics," by Virieux et al., published in *Geophysics*, Vol. 74, No. 6, pp. WCC1-WCC26, 2009).
3. It requires elastic modeling, or at least an accurate density model, to obtain amplitudes comparable to the recorded seismic data (as pointed out in "On the velocity-density ambiguity in acoustic full-waveform inversion," by A. Guitton, presented at the 76$^{th}$ EAGE Conference and Exhibition in Amsterdam, The Netherlands, 2014).

The above challenges are hard to overcome by an initial model, yet the failure to meet them results in convergence to local-minima (model without geological meaning) or in a density leakage into the velocity model. Therefore, the conventional FWI workflow relies on transmitted waves to derive the velocity model. However, due to limited offset information recorded in the seismic data, the maximum depth for which the velocity model can be updated using transmitted waves is limited.

Figure 5A:
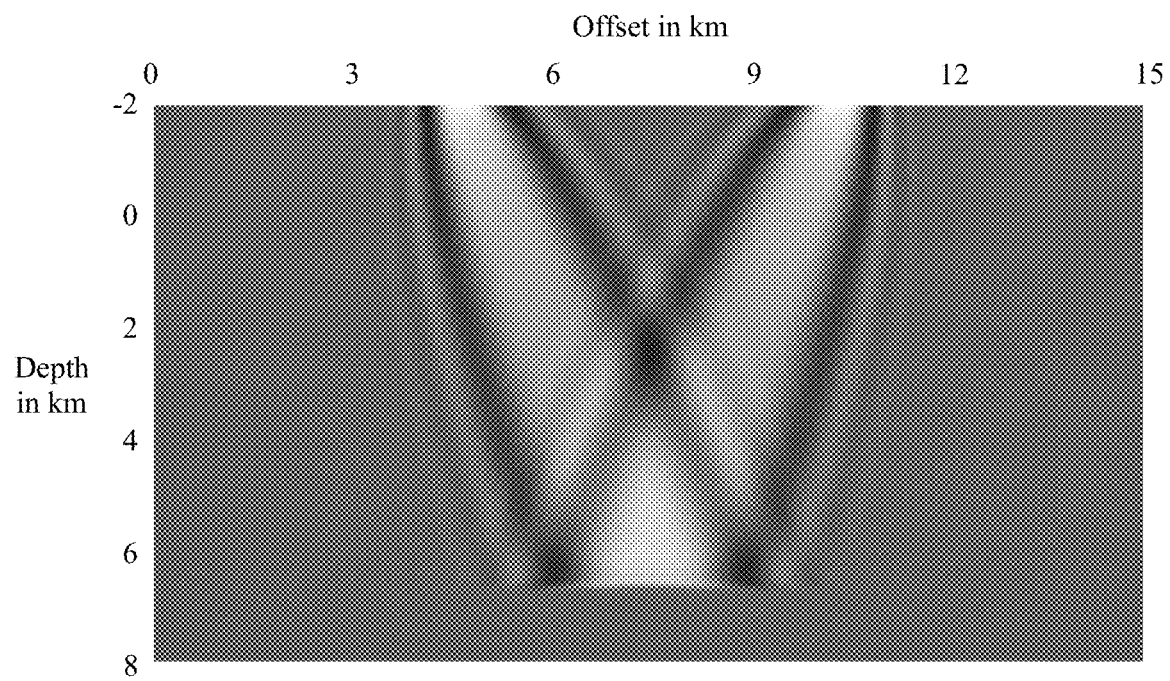
FIGS. 5A and 5B illustrate low-wavenumber component of gradient and high-wavenumber component of gradient.
Figure 5B:
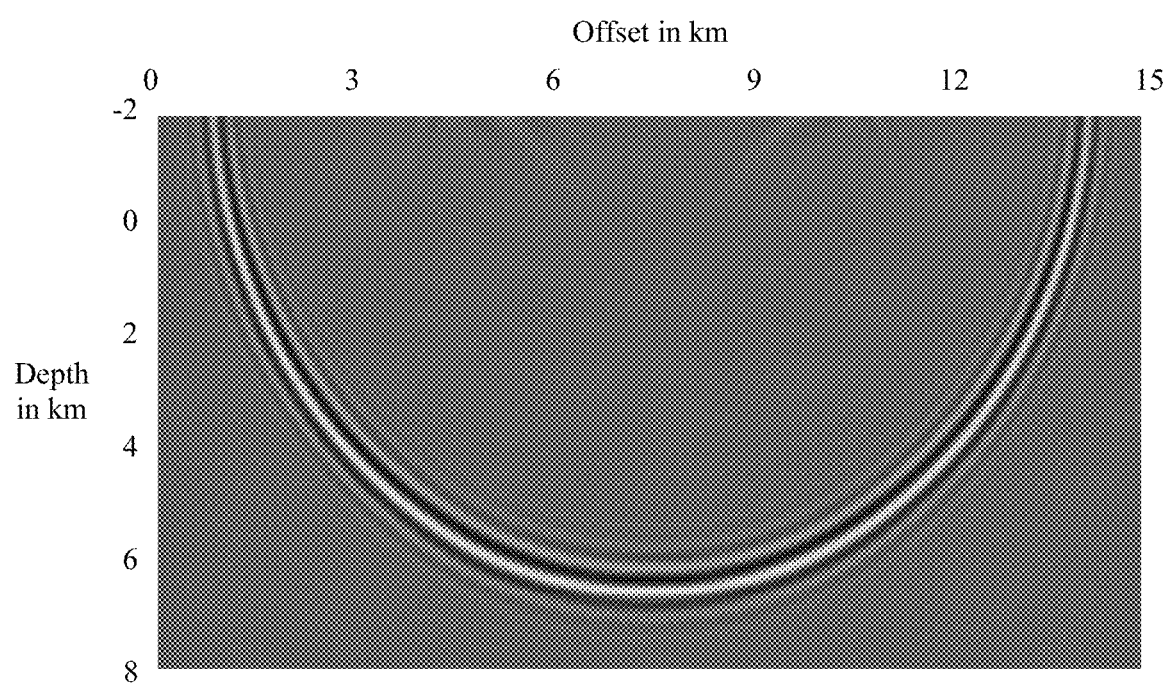

On the other hand, reflection data also contains information about deeper areas of the model. In addition, reflection data has been used by ray-based tomography methods to derive deep and low-wavenumber updates (see, e.g., "Stereotomography," by G. Lambaré, published in *Geophysics*, Vol. 73, No. 5, pp. VE25-VE34, 2008). As shown in the Mora's article, reflection data produces two different components in the FWI gradient: the high-wavenumber component, also known as migration term or migration "smile," and the low-wavenumber component, also known as tomographic term or "rabbit ears." FIGS. 5A and 5B illustrate these gradient components as nuances of gray in a vertical slice. While the migration term is more directly associated with the practical challenges previously described, the tomographic term is generated along the wavepath and provides a low-wavenumber update to the velocity model, including deeper areas, beyond the reach of transmitted waves.

In the conventional FWI gradient, the migration term is typically much stronger than the tomographic term; therefore, it dominates the velocity update using reflection data. To fully utilize the low-wavenumber information provided by reflections, a different FWI method needs to be used, i.e., a reflection FWI (RFWI).

A first requirement for RFWI is to extract the low-wavenumber component of the gradient in order to avoid interference from the migration term. The gradient components can be distinguished based on the direction of propagation of the source and residual wavefields (as described in the above-cited article by P. Mora, which is incorporated by reference in its entirety). The low-wavenumber component is formed by cross-correlation of wavefields traveling in the same direction, while the high-wavenumber component is formed by wavefields traveling in opposite directions. In practice, the separation can be achieved in many ways, such as inverse-scattering imaging condition (as described in the article, "A robust FWI gradient for high-resolution velocity model building," by Ramos-Martinez et al., published in SEG Technical Program Expanded Abstracts 2016, pp. 1258-1262), wavefield decomposition (as described in the article, "Reflection FWI," by Irabor et al., published in SEG Technical Program Expanded Abstracts 2016, pp. 1136-1140), and Born modeling (as described in the article, "Earth-model building from shallow to deep with full-waveform inversion," by Vigh et al., published in *The Leading Edge*, December 2016, pp. 1025-1030). All cited articles are incorporated by reference in their entirety.

Another cost-effective way to obtain the gradient components separation is using a 1-D Hilbert transform:

$$g_t = \frac{1}{v^3} \int_0^{t_{max}} \lambda \frac{\partial^2 p}{\partial t^2} + H_z(\lambda) H_z\left(\frac{\partial^2 p}{\partial t^2}\right) dt \quad (5)$$

$$g_m = \frac{1}{v^3} \int_0^{t_{max}} \lambda \frac{\partial^2 p}{\partial t^2} - H_z(\lambda) H_z\left(\frac{\partial^2 p}{\partial t^2}\right) dt$$

where $g_t$ and $g_m$ are, respectively, the low-wavenumber and high-wavenumber components and $H_z$ denotes the Hilbert transform in the z direction. Note that the summation of both components corresponds to the conventional FWI gradient (equation (4)). This method is described in the article, "An effective imaging condition for reverse-time migration using wavefield decomposition," by Liu, F. et al., published in *Geophysics*, Vol. 76, No. 1, 2016, pp. S29-S39, the entire content of which is incorporated herewith by reference.

The above-described techniques for generating synthetic data and calculating low-wavenumber and high-wavenumber components of an objective function's gradient (the objective function measuring the distance between the acquired data and the synthetic data) are relevant to both steps 220 and 240 of the method illustrated in FIG. 2. The low-wavenumber and high-wavenumber components are used separately in method 200.

A workflow of a method according to an embodiment is illustrated in FIG. 6. Starting from an initial velocity model and an initial density model 610 and recorded dataset 620, a synthetic (model-based) dataset is generated at 630 by solving, for example, the acoustic wave equation with variable density (p):

$$\frac{\partial^2 p}{\partial t^2} = v^2 \rho \nabla \cdot \left(\frac{1}{\rho} \nabla\right) p + f. \quad (6)$$

Additional information 615 may be used to constrain density and/or velocity models. For example, additional model properties such as anisotropy or attenuation parameters may be extracted from well log information. These additional properties may also be updated when updating the density and/or the velocity model.

An objective function measuring the difference between the recorded seismic dataset and the synthetic dataset is calculated based on the residuals between the two datasets. Then, the high-wavenumber component of the objective function's gradient relative to the model parameters is calculated using equation (5). This manner of processing is based on comparing the synthetic and the recorded datasets.

The density model is updated at 640 using this high-wavenumber component. For example, a velocity perturbation related to the high-wavenumber component may be converted into density perturbation using, for example, Gardner's relation (as described in the article, "Formation velocity and density—the diagnostic basics for stratigraphic traps," by Gardner et al., published in *Geophysics*, Vol. 39, No. 6, pp. 770-780, 1974, which is incorporated herein by reference in its entirety).

Estimating the density model in the context of acoustic FWI is challenging due to the strong coupling between velocity and density in the amplitude information. However, with the timing of events being the main driver of the updates, the amplitude of the synthetic data can be normalized to match the observed data, which means the method can tolerate some inaccuracies in the estimated density values.

At 650, a new synthetic dataset is generated using the velocity model and the updated density model, for example, by solving the acoustic wave equation with variable density (equation (6)). Then, at 650, an updated objective function is calculated based on residual between recorded seismic dataset and new synthetic dataset. A low-wavenumber component of the updated objective function's gradient may then be calculated using equation (5). As pointed out above, this manner of processing is based on comparing the synthetic and the recorded datasets. At 660, the velocity model is updated using this low-wavenumber component.

Steps 630-660 may be repeated until a stop criterion is reached. The stop criterion may be a predetermined number of iterations. Alternatively, the outcome (models) of a current iteration may be compared with the outcome of one or more prior iterations and the optimization is stopped when significant improvement is no longer observed. The flow can also be repeated for several frequencies or frequency bands until a satisfactory result is achieved.

Pre-processing (such as wavelength filtering) may be applied to the density model and/or the velocity model prior to steps 640 and 660. In step 640, the velocity model may be updated in addition to updating the density model. Alternatively, in step 640 the reflectivity model may be updated instead of the density model.

In step 660, the updated objective function may be calculated differently than how the objective function is calculated in step 640. Alternative ways of calculating objective function are L2 norm (as in equation (1)), cross-correlation of corresponding traces, or a data matching approach.

In the processing flow illustrated in FIG. 6, the backscattered energy is generated by the density contrasts introduced in the first phase (step 640). This, in turn, yields the "rabbit ears" (low-wavenumber component of the updated objective function's gradient) used to update the velocity model in the second phase (step 660). One advantage of this approach is that the first phase does not change the kinematics of the velocity model that is updated in the second phase.

The density and velocity models may be updated locally, in a predefined region, and the updating may be constrained by incorporating additional a priori information, such as, 4D differences or a tomographic Earth model update, etc. Imposing numerical optimization constraints may promote a specific behavior or belief in the Earth model, such as bound, or box constraint, edge-preserving constraint, total-variation constraint, hinge-loss one-sided constraint, etc., and all possible combinations of the above.

The software implementation may use different modeling engines, such as Kirchhoff, downward continuation, two-way wave equation or beam, or combinations of these modeling engines.

The above methods may use subsets of the recorded dataset, such as the near or far offsets, data in a specific time or space window. Different subsets may be used for updating the density model and for updating the velocity model. The model-based dataset generation and updating may be performed in different domains such as temporal, frequency, curvelet, etc., and over one dimension, two dimensions, or three dimensions.

When the recorded dataset is recorded with the sensors placed on the seafloor while sources are towed and fired above (i.e., source sampling is denser than receiver sampling) it may be beneficial to treat the sensors as computational sources based on reciprocity.

Figure 7:
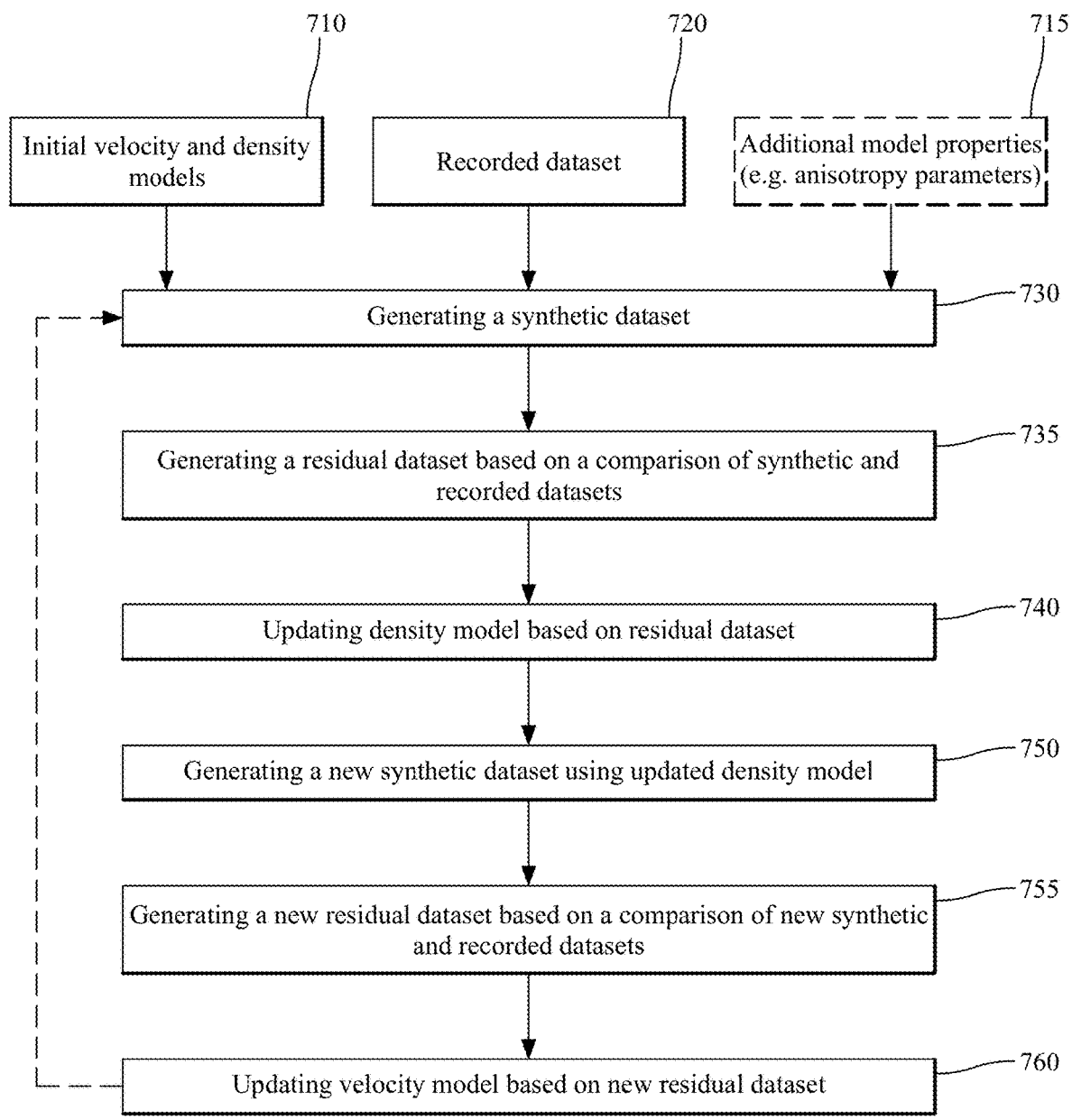
FIG. 7 is a workflow of a RFWI method according to another embodiment.

A variant of the flow in FIG. 6 is illustrated in FIG. 7. Steps 730 and 750 correspond to steps 630 and 650. Steps 640 and 660 are divided into more explicit sub-steps to emphasize that the residues are calculated first at 735 and 755, and are then used to update in turn the density and velocity models, at 740 and 760, respectively.

Figure 8:
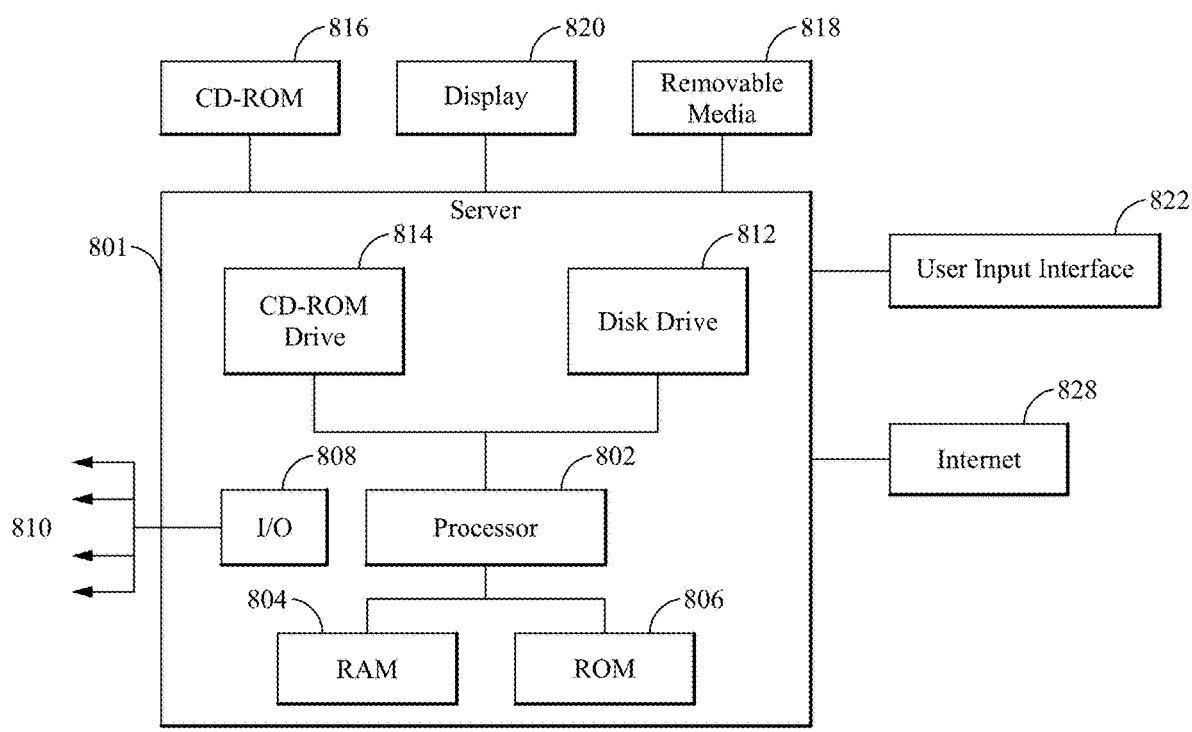
FIG. 8 is a schematic diagram of a computing device that can implement any of the methods discussed herein.

The above-discussed procedures and methods may be implemented in a computing device as illustrated in FIG. 8. Hardware, firmware, software or a combination thereof may be used to perform the various steps and operations described herein. Computing device 800 of FIG. 8 is an exemplary computing structure that may be used in connection with such a system. One advantage of the above-described embodiments (i.e., using the high-wavenumber component of the gradient to update the density model without changing the kinematics of the model) over reflectivity-based inversions is a definite decrease of computing costs, since extra propagations are not required to explicitly compute the scattered wavefields during the velocity update, which is the case for reflectivity-based methods. The computing converges to physically meaningful results faster.

Exemplary computing device 800 suitable for performing the activities described in the exemplary embodiments may include a server 801. Such a server 801 may include a central processor (CPU) 802 and a graphics processor (GPU) coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, seismic sensors, etc. The server may be part of a larger network configuration as in a global area network (GAN) such as the Internet 828, which allows ultimate connection to various landline and/or mobile computing devices.

A deep-water (1500-3500 m) wide-area azimuth (+/−8100 m and +/−4200 m inline and cross-line offsets) example illustrated in FIGS. 9-11 shows that the above-described RFWI methods improve the velocity model in an area below the salt, to a depth far greater than conventional FWI methods could, which resulted in a significant improvement of the image of the exploration target layers. In processing this dataset, the FWI gradient's high-wavenumber and low-wavenumber components have been obtained based on the propagation direction of the wavefields, and have been used alternately to update density and velocity models, respectively. The density model update introduces the deep reflectors needed for the recalculation of low-wavenumber component used for velocity model update. The results showed that this RFWI method improves the velocity model for the sediment mini-basins, the salt and subsalt where both ray-based tomography and FWI had limited success, and yields a better salt geometry interpretation and subsalt image.

Figure 9A:
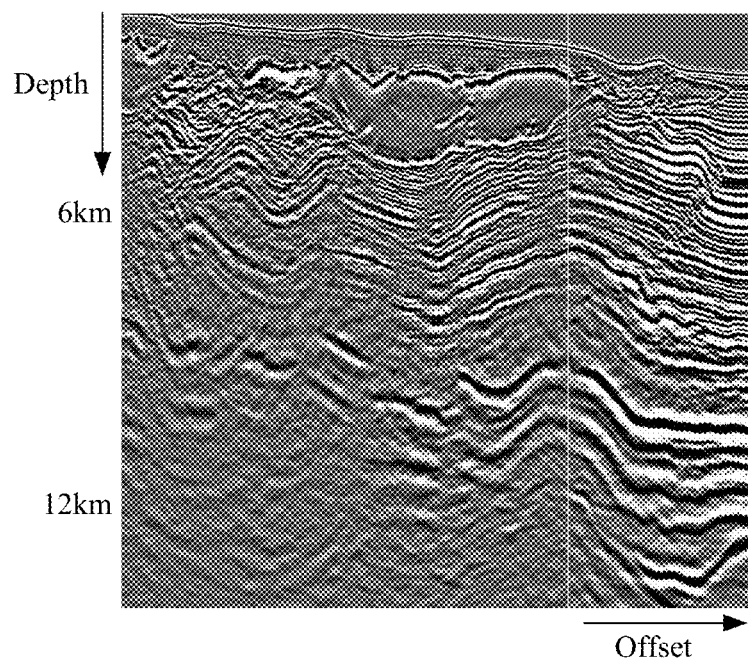
FIGS. 9A and 9B are dip vertical slices of sediment flood reverse time migration before and after applying the RFWI method according to an embodiment.
Figure 9B:
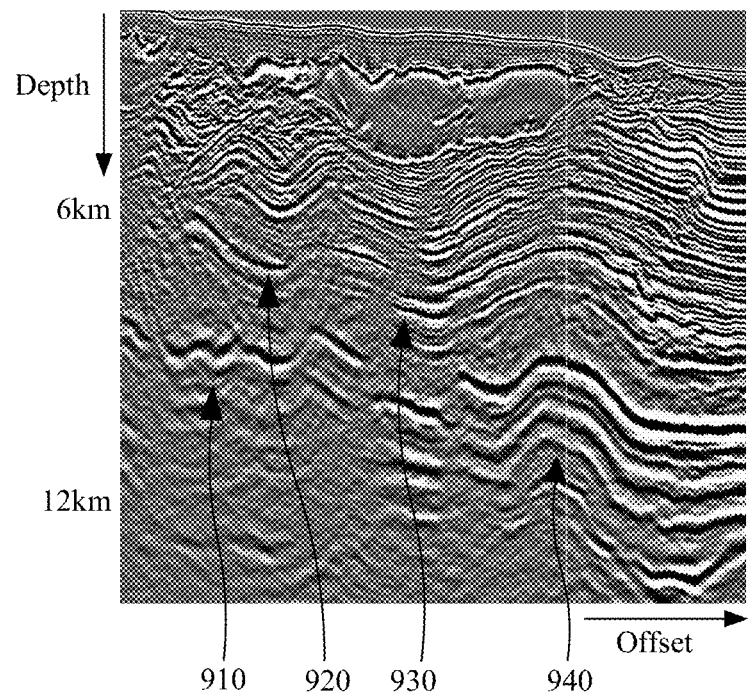

FIGS. 9-11 illustrate data processing improvements when using RFWI. FIG. 9A is a dip vertical slice illustrating the target sediments, obtained by reverse time migration (RTM), before applying the RFWI method, and FIG. 9B shows the same slice after applying the RFWI method according to an embodiment. Arrows 910-940 point to areas under the bottom of the salt (BOS) that were poorly imagined initially, and improved upon applying the RFWI method.

Figure 10A:
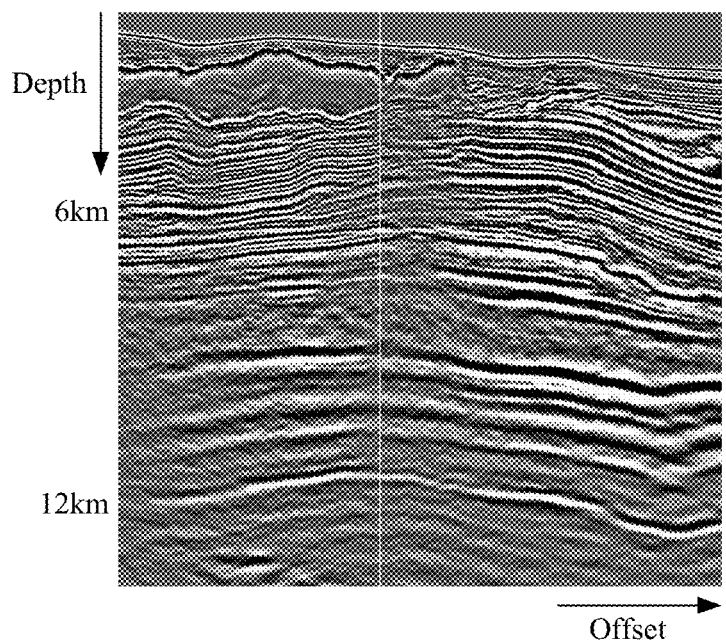
FIGS. 10A and 10B are strike vertical slices of sediment flood reverse time migration before and after applying the RFWI method according to an embodiment.
Figure 10B:
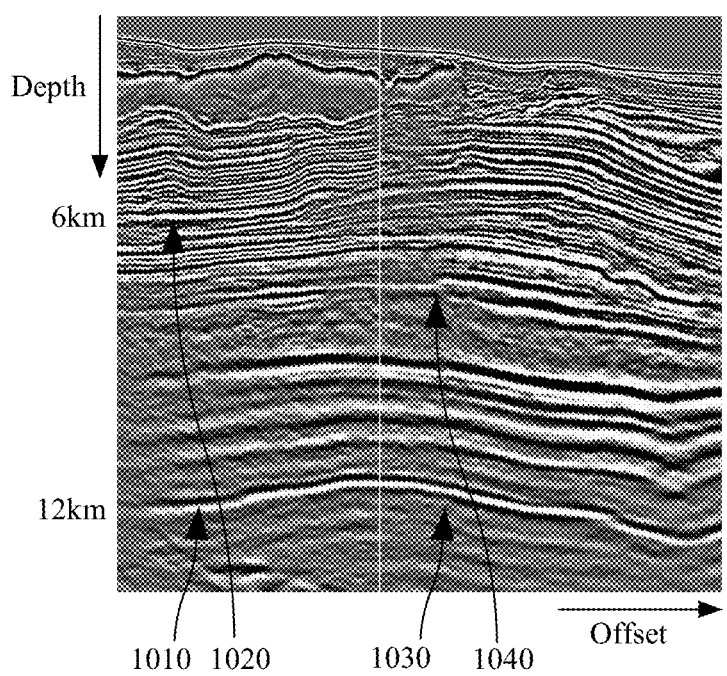

FIG. 10A is a strike vertical slice (i.e., a slice perpendicular to the slice in FIG. 9A) of the target sediments, obtained by RTM, before applying the RFWI method, and FIG. 10B shows the same slice after applying the RFWI method according to an embodiment. Arrows 1010-1040 point to areas under the BOS whose image is improved upon applying the RFWI method.

Figure 11A:
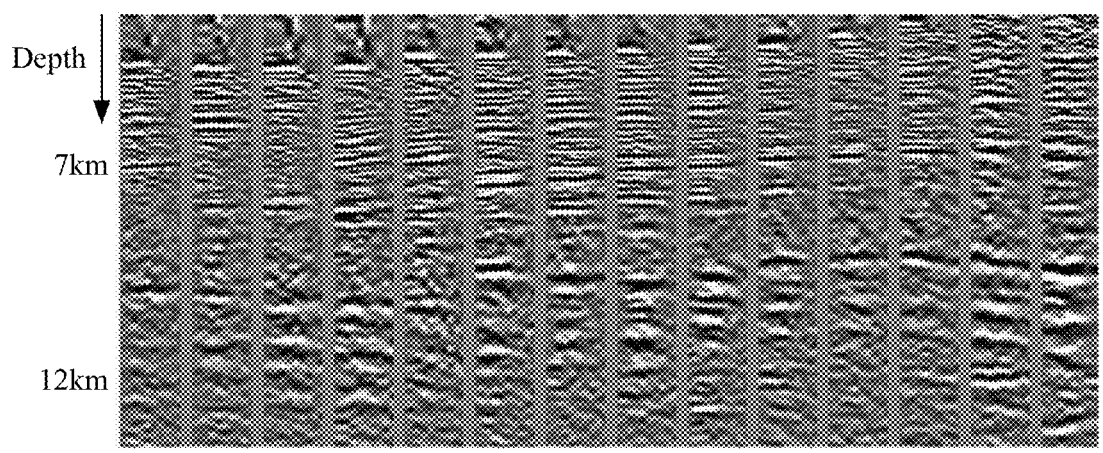
FIGS. 11A and 11B illustrate surface offset gathers before and after applying the RFWI method according to an embodiment.
Figure 11B:
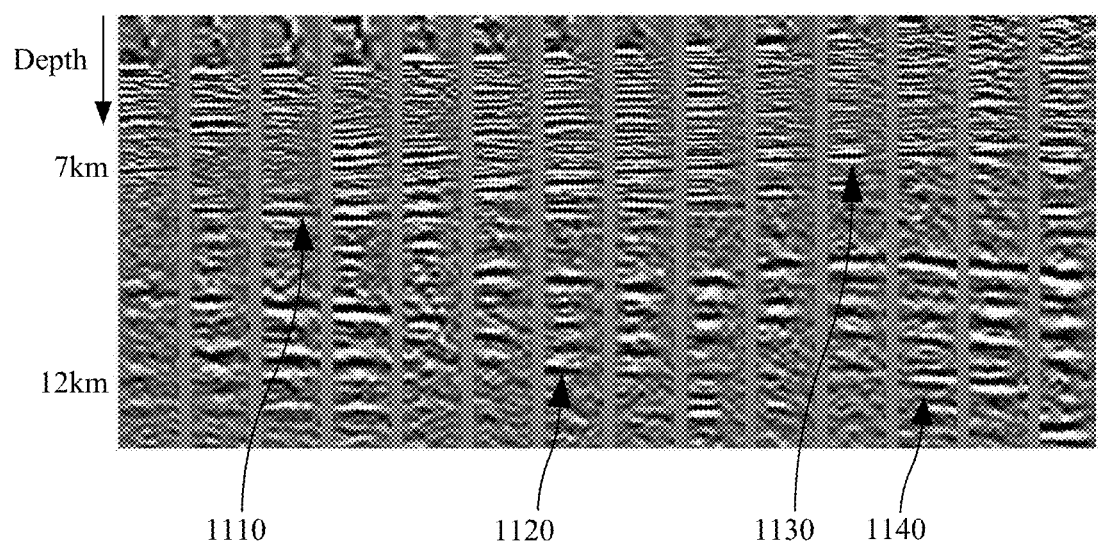

The RFWI method according to an embodiment used in the above-illustrated example had also a positive effect on the relative definition and flatness of surface offset gathers (SOGs), confirming that the update yields meaningful results. FIG. 11A illustrates SOGs before applying RFWI method, and FIG. 11B illustrates the same SOGs after applying RFWI (labels 1110-1140 indicating where RFWI improves in SOGs definition and flatness).

The disclosed exemplary embodiments provide a computing device, software instructions and a method for performing RFWI, updating density and velocity models of an explored underground formation separately using high-wavenumber and low-wavenumber of the FWI gradient, respectively. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for exploring a subsurface formation using seismic waves, the method comprising:
   receiving a seismic dataset recorded by seismic sensors detecting seismic waves emerging from the explored subsurface formation;
   generating a model-based dataset corresponding to the seismic dataset using a velocity model and a density model to calculate a gradient of an objective function measuring difference between the seismic dataset and the model-based dataset;
   updating the density model using a high-wavenumber component of the gradient;
   regenerating the model-based dataset for the subsurface formation using the velocity model and the updated density model, to calculate an updated gradient of an updated objective function;
   updating the velocity model using a low-wavenumber component of the updated gradient; and
   generating a structural image of the subsurface formation using the updated velocity model, for planning a drilling path therethrough.

2. The method of claim 1, wherein the generating of the model-based dataset, the updating of the density model, the regenerating of the model-based dataset and the updating of the velocity model are performed repeatedly.

3. The method of claim 2, wherein the generating of the model-based dataset, the updating of the density model, the regenerating of the model-based dataset and the updating of the velocity model are performed until a predetermined condition is met.

4. The method of claim 1, wherein the updated objective function is calculated in a different manner than calculating the objective function.

5. The method of claim 1, wherein at least some of anisotropy, elastic effects and attenuation are taken into consideration when generating the model-based dataset.

6. The method of claim 1, wherein the updating of the density model and/or the updating of the velocity model are subject to constraints so as the updated density model and/or velocity model to be closer to a physical reality of the explored subsurface than the density and/or velocity model prior to the respective updating.

7. The method of claim 6, wherein the constraints are based on additional structural information including well logs.

8. The method of claim 1, wherein the density model is also updated when updating of the velocity model using the low-wavenumber component of the gradient.

9. The method of claim 1, wherein the updating of the density and/or the updating of the velocity model is performed on a subset of the seismic dataset.

10. The method of claim 9, wherein the subset is selected to include near offsets, far offsets, a specific volume within the subsurface formation, or a specific space or time window.

11. The method of claim 1, wherein the updating of the density model is performed on a first subset of the seismic dataset, and the updating of the velocity model is performed on a second subset of the seismic dataset, the first subset being different from the second subset.

12. The method of claim 1, wherein the generating of the model-based dataset, the updating of the density model, the regenerating of the model-based dataset and the updating of the velocity model are performed at least twice so as a bandwidth used for the high-wavenumber component of the gradient and/or for the low-wavenumber component of the gradient be varied.

13. The method of claim 1, wherein at least one of anisotropy model and attenuation model is updated when the velocity model is updated.

14. A computing device for exploring a subsurface formation using seismic waves, the computing device comprising:
  an interface configured to receive a seismic dataset recorded by seismic sensors detecting seismic waves emerging from the explored subsurface formation; and
  a processor connected to the interface and configured;
    to generate a model-based dataset for the subsurface formation using a velocity model and a density model for calculating a gradient of an objective function measuring difference between the seismic dataset and the model-based dataset;
    to update the density model using a high-wavenumber component of the gradient;
    to regenerate the model-based dataset using the velocity model and the updated density model for calculating an updated gradient of an updated objective function;
    to update the velocity model using a low-wavenumber component of the updated gradient; and
    to generate a structural image of the subsurface formation using the updated velocity model, for planning a drilling path therethrough.

15. The computing device of claim 14, wherein the processor updates the density model and the velocity model repeatedly until a predetermined condition is met.

16. The computing device of claim 14, wherein the processor calculates the updated objective function is calculated in a different manner than calculating the objective function.

17. The computing device of claim 14, wherein the processor uses constraints so as the updated density model and/or velocity model to be closer to a physical reality of the explored subsurface than the density and/or velocity model prior to the respective updating.

18. The computing device of claim 14, wherein the processor uses a first subset of the seismic dataset for updating the density model, and a second subset of the seismic dataset for updating the velocity model, the first subset being different from the second subset.

19. The computing device of claim 14, wherein the processor loops through generating of the model-based dataset, updating of the density model, regenerating of the model-based dataset and updating of the velocity model at least twice so as a bandwidth used for the high-wavenumber component of the gradient and/or for the low-wavenumber component of the gradient be varied.

20. A non-transitory computer readable recording medium storing executable codes which when executed by a computer make the computer perform a method for exploring a subsurface formation using seismic waves, the method comprising:
  receiving a seismic dataset recorded by seismic sensors detecting seismic waves emerging from the explored subsurface formation;
  generating a model-based dataset corresponding to the seismic dataset using a velocity model and a density model to calculate a gradient of an objective function measuring difference between the seismic dataset and the model-based dataset;
  updating the density model using a high-wavenumber component of the gradient;
  regenerating the model-based dataset for the subsurface formation using the velocity model and the updated density model, to calculate an updated gradient of an updated objective function;
  updating the velocity model using a low-wavenumber component of the updated gradient; and
  generating a structural image of the subsurface formation using the updated velocity model, for planning a drilling path therethrough.

* * * * *